United States Patent [19]

Builta et al.

[11] 4,304,375

[45] Dec. 8, 1981

[54] ELECTRICALLY CONTROLLED ELEVATOR

[75] Inventors: Kenneth E. Builta, Euless; Samuel W. Ferguson, III, Fort Worth, both of Tex.

[73] Assignee: Textron Inc., Providence, R.I.

[21] Appl. No.: 39,943

[22] Filed: May 17, 1979

[51] Int. Cl.³ .............................................. B64C 11/44
[52] U.S. Cl. ................................. 244/17.13; 244/178; 318/564; 318/584
[58] Field of Search ..................... 244/17.13, 194, 195, 244/178, 180, 181, 224; 318/563, 564, 565, 584; 364/434; 73/178 H, 65

[56] References Cited

U.S. PATENT DOCUMENTS

| 3,584,814 | 6/1971 | Murphy | 244/178 |
| 4,032,083 | 6/1977 | Maciolek | 244/17.13 |
| 4,095,763 | 6/1978 | Builta | 244/194 |
| 4,103,848 | 8/1978 | Johnson, Jr. et al. | 244/17.13 |

*Primary Examiner*—Harold Broome
*Assistant Examiner*—Reinhard J. Eisenzopf

*Attorney, Agent, or Firm*—Richards, Harris & Medlock

[57] ABSTRACT

A helicopter elevator (12, 13) is driven by an electrical actuator (20) to position the elevator (12, 13) to an optimum angle of incidence for given flight conditions. The actuator (20) is included within a servo loop which responds to a command signal derived from an electronics module (69). Transducers which measure longitudinal cyclic position (40), collective pitch position (41) and air speed (42) generate signals which are summed in a summation unit (43). The output of the summation unit (43) is passed through a signal multiplier (45) which has the gain thereof set inversely proportional to air speed. A trigger unit (56) activates the signal multiplier (45) at an air speed above a preset threshold. An integrator (54) integrates the sum of the outputs of the longitudinal cyclic position transducer (40) and air speed transducer (42) to compensate for different center of gravity aircraft loadings. Duplicate electronic systems are provided to drive a pair of servo motors (36a, 36b) with brakes provided to lock the actuator (20) when an electronic failure is detected.

30 Claims, 8 Drawing Figures

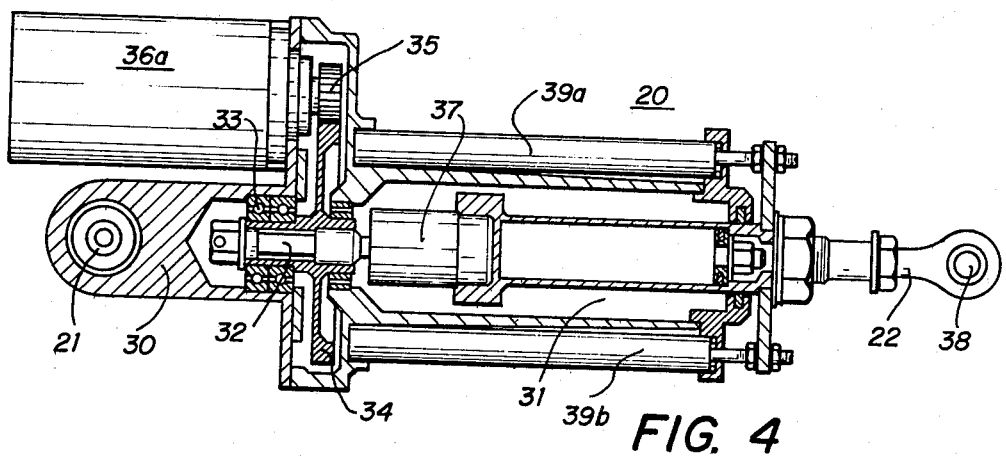
FIG. 4
FIG. 5
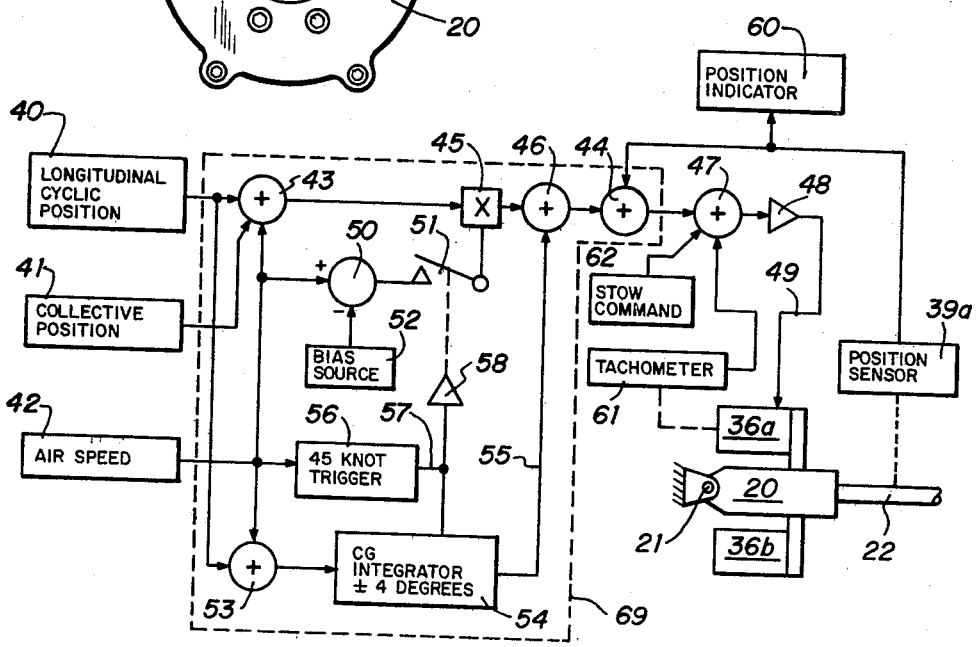
FIG. 6

ELECTRICALLY CONTROLLED ELEVATOR

TECHNICAL FIELD

This invention relates to the control of elevators or stabilizers on a helicopter and more particularly to a system of control for minimizing the requirements to adjust for primary flight control changes, aircraft weight, change of location of center of gravity, air speed variation, and similar variables.

Further, the present invention provides for change in incidence of the elevator in response to collective pitch commands to cause the elevator to assume a preferred or optimum incidence when the aircraft is caused to either climb or descend.

DESCRIPTION OF THE PRIOR ART

Heretofore, elevators on helicopters have been provided in a fixed immovable incidence or position on the tail boom. In other aircraft, such as the Bell Helicopter Model 214, an elevator is utilized that may vary its incidence. In prior systems, such as said Model 214, a mechanical linkage extends from the swashplate to a control arm on the pivot axis of the elevator to control the incidence of the elevator proportional to the longitudinal cyclic command. Such control represents a compromise, and not the optimum position for operation of the elevator.

It has been found desirable to provide control for the elevator which takes into account a number of different factors so that rather than operate on a compromise basis, the elevator incidence is optimized for given flight conditions.

DESCRIPTION OF THE PRESENT INVENTION

In accordance with the present invention, variable control is provided for a position-servo driven helicopter elevator. A longitudinal cyclic command sensor provides a first output signal. A collective pitch position sensor provides a second output signal. An air speed sensor provides a third output signal. Means are provided to combine the outputs of the three sensors above-noted to produce a summation signal. The summation signal is then modified by a factor which changes inversely relative to the output of the air speed sensor. The modified summation signal is then applied as the input signal to the elevator servo. In the preferred embodiment, the system is made redundant in order to provide fail-operate capability.

BRIEF DESCRIPTION OF THE DRAWINGS

A more complete understanding of the invention and its advantages will be apparent from the following Detailed Description taken in conjunction with the accompanying drawings in which:

FIG. 4 is a sectional view of the elevator actuator shown in FIG. 3;

FIG. 5 is an end view illustrating the arrangement of drive motors for the actuator shown in FIG. 4;

FIG. 6 is a schematic diagram showing the generation of signals for the motor driving the elevator in accordance with the present invention;

DETAILED DESCRIPTION

Figure 1:
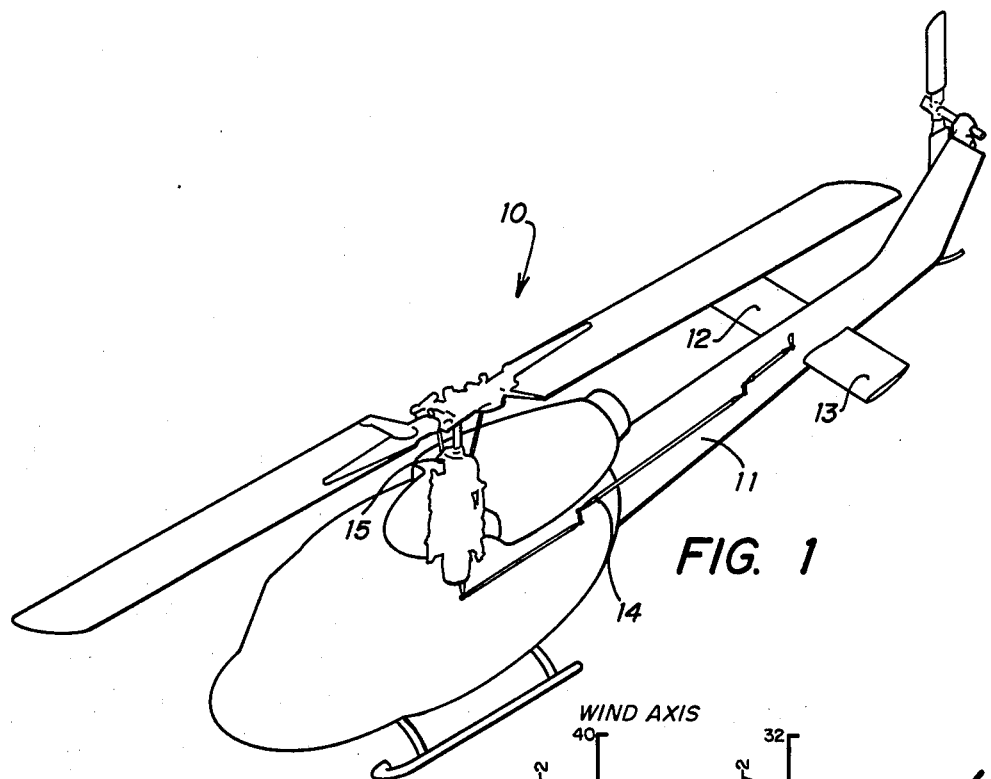
FIG. 1 illustrates a helicopter having an elevator, the incidence of which is to be controlled.

Referring now to FIG. 1, a helicopter 10 is illustrated with a tail boom 11 having elevator panels 12 and 13 extending laterally from the rear of boom 11. As previously mentioned, in some aircraft the elevators are fixed in position relative to the boom while in the aircraft as shown in FIG. 1 the incidence of the elevator is controlled through a mechanical linkage 14 which is connected to a swash plate 15. In the present case, the elevator is selectively movable in order to optimize the performance of the aircraft insofar as the incidence of the elevator has an effect upon flight characteristics of the aircraft.

Figure 2:
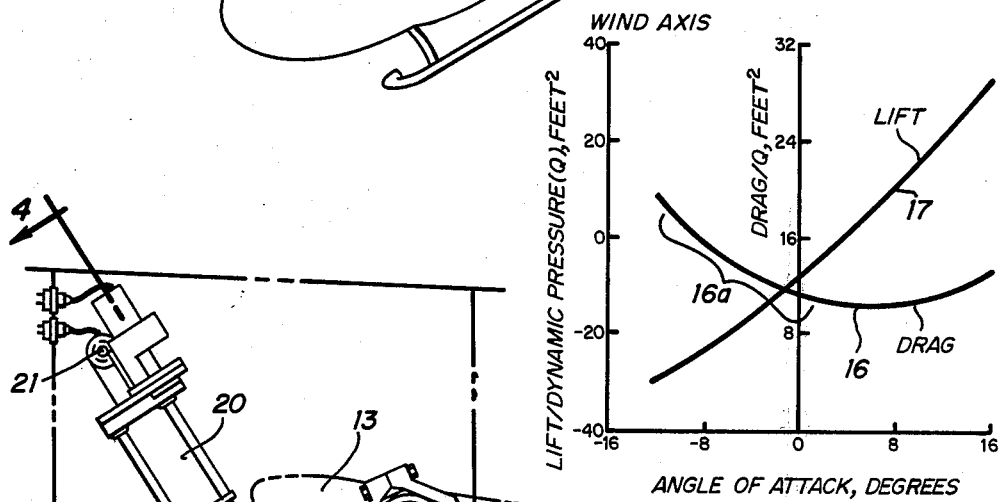
FIG. 2 is a graph which illustrates the relationships between angle of attack, dynamic pressure, lift and drag.

Referring to the graph in FIG. 2, there are illustrated various aerodynamic characteristics for a Bell Helicopter Model 214ST. The abscissa is scaled for aircraft angle of attack while the ordinates show dynamic pressure for lift and drag. Curve 16 illustrates the relationship of aircraft drag to the angle of attack. On the same scale, curve 17 illustrates the relation of lift to angle of attack. The detrimental effect on aircraft performance of even slight negative attack angles is shown by the curve segment 16a. Within this segment of curve 16, drag is substantially increased. This increase in drag causes fuel consumption to increase which in turn decreases the range of the helicopter. A primary object of the present invention is to maintain an optimum longitudinal attitude to minimize drag and maximize lift on the aircraft despite operation under varied flight and load conditions.

Figure 3:
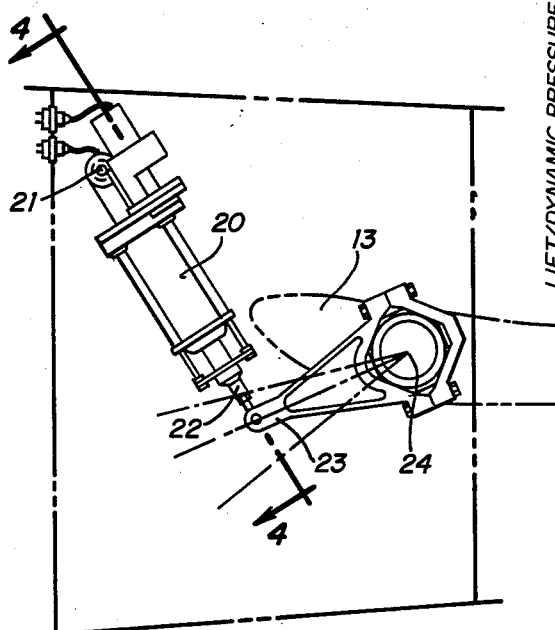
FIG. 3 illustrates an elevator actuator installation.

In accordance with the present invention, rather than control the incidence of the elevator by a mechanical linkage from the cabin portion of the aircraft, a local elevator actuator is provided. Such actuator may be of the type illustrated in FIG. 3. Actuator 20 is pivotally mounted at point 21 with an actuator rod 22 coupled to an elevator pitch arm 23. Upon movement of the rod 22 the elevator 13 will be forced to rotate about the axis of its mounting shaft 24. Actuator 20 preferably is of the electric motor driven type.

Referring to FIG. 4, a suitable actuator is shown in section taken along lines 4—4 of FIG. 2. Pivot point 21 is coupled to a frame portion 30 of the actuator. The actuator has a central cylindrical cavity 31. A motor driven screw 32 is journaled in bearings 33 and is driven by way of a gear 34 from a pinion gear 35 mounted on the output shaft of a motor 36a. Motor 36a preferably is a two-phase reversible motor. A suitable motor is identified by part No. 05088-CU09609169 manufactured and sold by Singer Company of New Jersey.

Screw 32 of the actuator 20 is caused to rotate by operation of pinion 35 on gear 34. A traveling nut 37 is thereby moved axially in the cavity 31 driving the rod 22. Coupling to the elevator pitch arm 23 is completed at the pivot point 38. Actuator 20 includes linear position sensors 39a and 39b comprising linear potentiometers which indicate the extension of rod 22.

It will be observed in FIG. 4, motor 36a is shown in its operative relation for driving the gear 34. It will be understood that two such motors preferably are provided for control of the actuator 20 when used in accordance with the present invention.

In FIG. 5 actuator 20 is provided with a first bracket 20a to which the motor 36a is secured. A second bracket 20b provides a base for mounting a second motor 36b. Each of motors 36a and 36b is provided with a pair of brake windings. Each motor operates such that if both its brake windings are not energized the brake is applied and the motor cannot turn. The operation of the motor is further such that if either brake winding is energized then the motor is free to turn in response to motor excitation. This action will be further described in connection with the fail-safe redundant operation of the system.

An important aspect of the present invention involves the control of the character of the signal supplied to the motors which drive actuator 20. A system diagrammatically illustrating generation of such signals is shown in FIG. 6 where actuator 20 is illustrated along with motors 36a and 36b. Actuator 20 is coupled to the pivot point 21 and operates to extend and retract the rod 22 to control elevator position.

In accordance with the present invention the longitudinal cyclic position of the control stick is sensed by a first transducer 40. A signal proportional to the collective stick position is generated by a transducer 41. An air speed transducer provides an air speed proportional signal from the transducer 42. The output signal from transducers 40, 41 and 42 is then applied to a summation unit 43. The output of the summation unit 43 is then applied to a signal multiplier 45. The output of the signal multiplier 45 is applied to a summation unit 46 whose output is applied to a summation unit 44. The output of summation unit 44 is in turn provided as a first input to a summation unit 47. The output of summation unit 47 is applied by way of a power amplifier 48 and channel 49 to motor 36a.

The output of the air speed transducer 42 is also applied to a summation unit 50. The output of the summation unit 50 is selectively applied by way of a switch 51 to the second input to multiplier 45. The summation unit 50 is provided with a bias voltage from a source 52. The output of bias source 52 is made sufficiently negative so that an increasing air speed sensor voltage is offset to produce an output from summation unit 50 that approaches zero with greater output from air speed transducer 42.

The output of the longitudinal cyclic position transducer 40 and the output of the air speed transducer 42 are supplied to a summation unit 53. The output of summation unit 53 is applied to a center of gravity integrator 54 which provides an output signal on channel 55 leading to and supplying the second input of the summation unit 46.

A trigger circuit 56 provides an output signal on channel 57 when and only when the air speed is above a predetermined threshold level. As indicated in FIG. 6, a threshold level appropriate for an aircraft such as Bell Helicopter Model 214ST, may be selected to be 45 knots. Integrator 54 normally is deactivated and does not respond to the signal output from the summation unit 53 at low air speeds. When the output from trigger circuit 56 appears on channel 57, the integrator is energized and responds to the output signal from summation unit 53. Thus, prior to the time the air speed reaches the predetermined threshold, the signal on channel 55 is zero. Afterwards the signal on channel 55 is the integral of the sum of the two input signals supplied to summation unit 53.

Output channel 57 is connected to a switch actuator 58 to cause switch 51 to be closed when the air speed reaches the selected threshold.

From the foregoing, it will be understood that the output from the multiplier 45 will be zero for all air speeds below the preselected threshold. Thereafter, the position of the elevator is controlled in response to the output signal from the summation unit 46.

The actuator 20 operates in a position dependent servo loop that utilizes the servo position sensor 39a which is in turn connected back into the summation unit 44. The position component of the actuator control is thus supplied by the sensor 39a. The velocity component of the control for the actuator is provided by tachometer 61 which provides a third input to the summation unit 47. The elevator position is shown to the pilot by a position indicator 60.

A stow command unit 62 provides a bias signal to summation unit 47 for positioning the elevator to a selected incidence when no output voltage is supplied from summation unit 44.

In the system above described the position of the elevator will be dependent upon the signal output from the summation unit 46. The electronic transducers 40, 41 and 42 measure longitudinal cyclic stick position, the collective control position and the air speed, respectively. The functions of these signals are used to position the elevator which:

(a) controls the center of gravity (cg) effects on aircraft pitch attitude in forward flight;
(b) increases aircraft static longitudinal stability;
(c) minimizes aircraft trim changes with power; and
(d) increases aircraft pitch dynamic stability.

Figure 7:
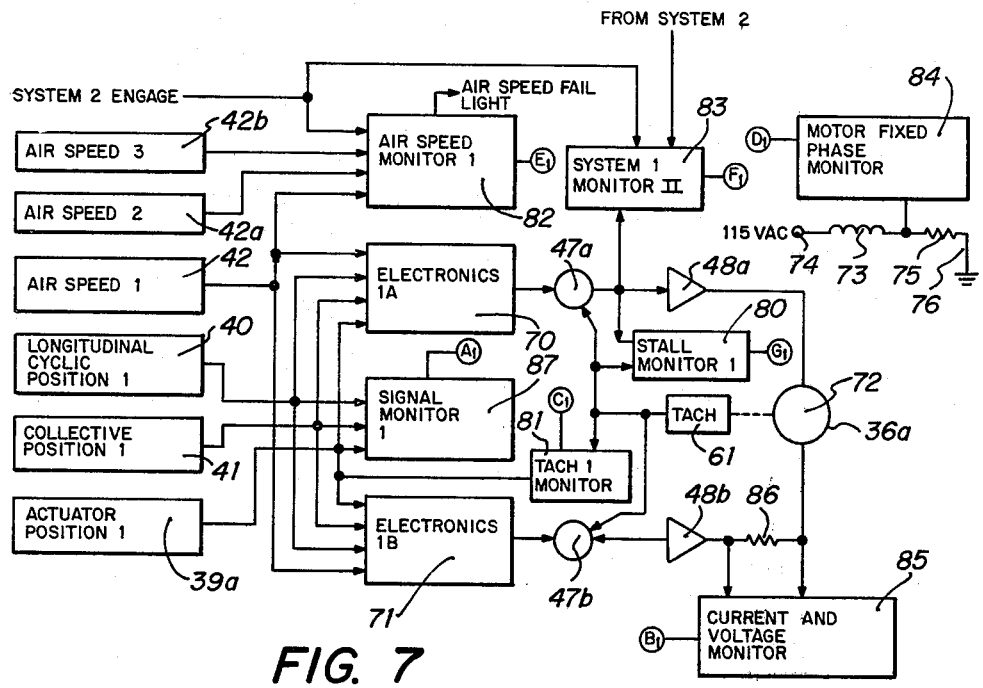
FIG. 7 illustrates fail/monitor logic employing signals produced in the system of FIG. 6.

Referring now to FIG. 7, a system for driving motor 36a is shown in a more comprehensive setting than in FIG. 6. The system for driving motor 36a will be referred to as System 1. The system for driving motor 36b will be referred to as System 2.

System 1 is comprised of a pair of substantially identical electronic units 70 and 71. The electronic units 70 and 71 each comprise the elements within bracket 69, FIG. 6. The output of electronic unit 70 is applied to summation unit 47a. Unit 71 is applied to the summation unit 47b. Two amplifiers 48a and 48b are provided to drive the control phase 72 of motor 36a from a source producing a maximum of 15 volts AC. Motor 36a in this system is a motor having the fixed phase or winding 73 which operates from a source producing 115 volts AC. Fixed phase 73 is connected at point 74 to 115 volt AC source and by way of a monitor resistor 75 to a ground terminal 76. Transducers 40, 41 and 42 are connected to each of the electronic units 70 and 71 to provide the necessary signals to drive the control phase or winding 72 of motor 36a. It will also be noted that the actuator position sensor 39a is connected to both of the units 70 and 71 so that its position signal output is already included in the summation signals at the outputs of the summation units 47a and 47b. Note that the tachometer 61 has its output applied to both the summation units 47a and 47b. In addition, the output of tachometer 61 is connected to a stall monitor unit 80 and to a tachometer monitor unit 81. The second input for the stall monitor 80 is supplied by the output of the summation unit 47a. The second input for the tachometer monitor 81 is supplied directly by the position actuator transducer 39a. Air speed is monitored by a air speed monitor unit 82. A System 1 monitor unit 83 is provided with inputs from summation unit 47a, a System 2 engage signal and the output of a summation unit in the second system corresponding to the summation unit 47a. That is, the monitor 83 compares the output of summation unit 47a with the output from its counterpart in System 2 if and only if the System 2 is engaged.

A motor fixed phase monitor 84 is provided to indicate whether or not the current in the fixed phase is at a proper value. Monitor 84 notes any deviation of current amplitude beyond present upper and lower boundaries. A current and voltage monitor unit 85 senses the voltage drop across a monitor resistor 86 to detect an excessive difference between the outputs of the amplifiers 48a and 48b.

Amplifiers 48a and 48b produce alternating current drive signals which are amplitude modulated by the input signals. The output of amplifier 48a is inverted from that of amplifier 48b such that opposite polarity signals are applied to the control phase 72 of motor 36.

A signal monitor 87 is provided to indicate whether or not the transducers 40, 41 and 39a are operative to provide output signals for the system. Monitor 87 detects an open or short circuit in any transducer or transducer wiring.

The monitor units of FIG. 7 provide outputs labeled as follows:

TABLE 1

| Monitor Unit | Output |
| --- | --- |
| 87 | $A_1$ |
| 85 | $B_1$ |
| 81 | $C_1$ |
| 84 | $D_1$ |
| 82 | $E_1$ |
| 83 | $F_1$ |
| 80 | $G_1$ |

In Table 1 the subscripts "1" refer to System 1. The corresponding units in System 2 produce a corresponding group of outputs having a "2" subscript.

It will be noted from FIG. 7 that there are present three air speed transducers 42, 42a and 42b. Three air speed transducers are employed to permit reliable operation of the elevator control system. The output from transducer 42 serves System 1, the output from transducer 42a serves System 2 and the output from air speed transducer 42b is used only for monitoring purposes. Monitor 82 compares the outputs of air speed transducers 42, 42a and 42b to determine if one or more of the transducers is defective. If two of the transducer outputs compare but the third transducer produces a different output, the System 1 or 2 which receives the differing output will be disabled while the remaining System drives actuator 20. If no two of the transducers produce corresponding outputs both Systems 1 and 2 will be disabled and the elevator will be locked in the position it had when the noncorrespondence was noted. The process of comparison is carried out by comparing the voltage amplitudes produced by each of the transducers and generating an error signal for each transducer which does not produce a comparison to the other transducers.

Figure 8:
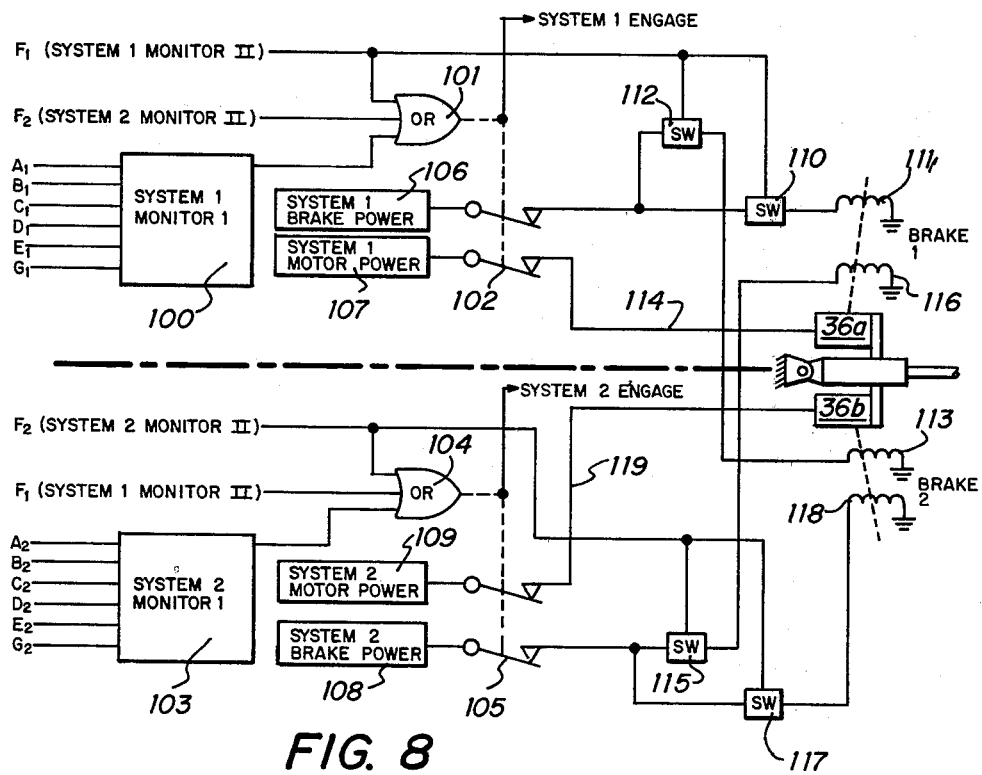
FIG. 8 illustrates fail/disengage logic to be used with the systems of FIGS. 6 and 7.

In FIG. 8, a fail/disengage logic system utilizing the outputs of System 1 monitor units along with similar outputs of System 2 monitor units is illustrated.

The monitor signals $A_1$-$E_1$ and $G_1$ set out in Table 1 are connected to a System 1 monitor unit 100. The signal $F_1$ is not connected to unit 100 but is supplied as a first input to an OR gate 101. Unit 100 is connected to OR gate 101 which has as a third input the monitor signal $F_2$ from System 2. The OR gate 101 in response to any one of three signals $F_1$, $F_2$ or the output of monitor unit 100 will cause a power relay 102 to remove power from the motor drive system.

In a similar manner, a monitor 103 receives the designated signals for System 2 to provide a shutdown signal at the input of an OR gate 104 in the event any one of the monitor signals exceeds a preset threshold. Signals $F_1$ and $F_2$ are also provided as inputs to OR gate 104. When any one of the three inputs to OR gate 104 is actuated, power relay 105 is opened and electrical power to motor 36b is terminated.

In FIG. 8, it will be noted that System 1 brake power source 106 is provided by way of relay 102 and a switch 110 which leads to a motor brake winding 111. System 1 brake power 106 is also applied by way of a switch 112 to a brake winding 113 on motor 36b. System 1 motor power source 107 is also applied by way of channel 114 to motor 36a. In a similar manner System 2 brake power source 108 is applied by way of switch 115 to a second brake winding 116 on motor 36a. System 2 brake power 108 is supplied by way of switch 117 to a second brake winding 118 on motor 36b. System 2 motor power source 109 is supplied by way of channel 119 to motor 36b.

Switches 110, 112, 115 and 117 are provided for the purpose of responding to the occurrence of signals $F_1$ and $F_2$. That is, if a signal $F_1$ occurs then switch 110 opens to deenergize winding 111. Switch 112 opens to deenergize winding 113. If signal $F_2$ occurs, then switch 115 opens to deenergize winding 116. Switch 117 opens to deenergize winding 118. Motor 36a will be operative if system power is applied and if either winding 111 or 116 is energized. Similarly, motor 36b will operate with system motor power applied if either winding 113 and 118 is energized. The schematic arrangement illustrated in FIG. 8 is provided, with particular emphasis upon making certain that upon failure of the stabilizer drive system, the elevator will be locked in its final position rather than being left uncontrolled. The arrangement of FIG. 8, upon failure of the system, assures that the stabilizer will be locked in a given position and will not be free to respond to aerodynamic or inertial forces.

Although several embodiments of the invention have been illustrated in the accompanying drawings and described in the foregoing detailed description, it will be understood that the invention is not limited to the embodiments disclosed, but is capable of numerous rearrangements, modifications, and substitutions without departing from the scope of the invention.

We claim:

1. A helicopter control system for positioning a servo driven elevator, comprising:
    (a) a longitudinal cyclic command sensor,
    (b) a collective pitch position sensor,
    (c) an air speed sensor,
    (d) means for combining the outputs of said sensors to produce a summation signal,
    (e) means for modifying said summation signal by a factor which changes inversely relative to said air speed, and
    (f) means for applying said modified summation signal as the input to said servo.

2. A helicopter control system as recited in claim 1 further including means for applying a predetermined bias signal to said servo when the output of said air speed sensor is below a preset threshold.

3. A helicopter control system for positioning a servo driven elevator, comprising:
   (a) a longitudinal cyclic command sensor,
   (b) a collective pitch position sensor,
   (c) an air speed sensor,
   (d) means for combining the outputs of said sensors to produce a summation signal,
   (e) means for modifying said summation signal by a factor which changes inversely relative to said air speed,
   (f) means for applying said modified summation signal as the input to said servo,
   (g) means for combining the outputs of said longitudinal cyclic command sensor and said air speed sensor to produce a second summation signal,
   (h) means for integrating said second summation signal, and
   (i) means for combining the output of said means for modifying with the output of said means for integrating for application as the input to said servo.

4. A helicopter control system as recited in claim 3 further including means for disabling said means for integrating when the output of said air speed sensor is below a preset threshold.

5. A helicopter control system for operating an elevator driven by a servo system having a fixed and a controlled phase motor, comprising:
   (a) a longitudinal cyclic command sensor,
   (b) a collective pitch position sensor,
   (c) an air speed sensor,
   (d) means for combining the outputs of said sensors to produce a first summation signal,
   (e) means for modifying said first summation signal by a factor which changes inversely relative to said air speed,
   (f) means for combining the outputs of said sensors to produce a second summation signal,
   (g) means for modifying said second summation signal by a factor which changes inversely relative to said air speed,
   (h) means for applying a constant power signal to a fixed phase of said servo motor,
   (i) means for applying said first summation signal as an input to the servo system for driving the control phase of said servo motor, and
   (j) means for applying said second summation signal as an input to the servo system for driving the control phase of said servo motor.

6. A helicopter control system as recited in claim 5 further including means for applying a bias signal to said servo system for positioning the elevator at a selected incidence when the output of said air speed sensor is below a predetermined threshold.

7. A helicopter control system as recited in claim 5 further including a current sensor for monitoring current flow through said fixed phase and means for terminating the electrical power supplied to said servo motor when the amplitude of said current is outside a preselected range.

8. A helicopter control system as recited in claim 5 further including a voltage and current sensor for monitoring the voltage and current applied to said control phase of said servo motor and means for terminating the electrical power supplied to drive said servo motor when the ratio of said voltage and current is outside preset boundaries.

9. A helicopter control system as recited in claim 5 further including means for detecting the failure of any one of said sensors and means for terminating the electrical power supplied to drive said servo motor when a sensor failure is detected.

10. A helicopter control system as recited in claim 5 further including:
    (a) a second air speed sensor,
    (b) a third air speed sensor,
    (c) means for detecting when the output of said first air speed sensor does not compare with the outputs of said second and third air speed sensors, and
    (d) means for terminating the electrical power supplied to drive said servo motor when the output of said first air speed sensor fails to compare with the outputs of said second and third air speed sensors.

11. A helicopter control system for positioning an elevator, comprising in combination:
    (a) a first system including,
       (i) a first longitudinal cyclic command sensor,
       (ii) a first collective pitch position sensor,
       (iii) a first air speed sensor,
       (iv) means for combining the outputs of said first sensors to produce a first summation signal,
       (v) means for modifying said first summation signal by a factor which changes inversely relative to said air speed,
       (vi) means for combining the outputs of said first sensors to produce a second summation signal,
       (vii) means for modifying said second summation signal by a factor which changes inversely relative to said air speed,
       (viii) a first servo motor driven by an electrical power source through a first power switch and connected to drive said elevator, said servo motor having a control winding with first and second terminals,
       (ix) means for applying said modified first and second summation signals as the inputs to said first and second terminals, respectively, of said first servo motor,
    (b) a second system including:
       (i) a second longitudinal cyclic command sensor,
       (ii) a second collective pitch position sensor,
       (iii) a second air speed sensor,
       (iv) means for combining the outputs of said second sensors to produce a third summation signal,
       (v) means for modifying said third summation signal by a factor which changes inversely relative to said air speed,
       (vi) means for combining the outputs of said second sensors to produce a fourth summation signal,
       (vii) means for modifying said fourth summation signal by a factor which varies inversely relative to said air speed,
       (viii) a second servo motor driven by an electrical power source through a second power switch and connected to drive said elevator, said servo motor having a control winding with first and second terminals, and
       (ix) means for applying said modified first and second summation signals as the inputs to said first and second terminals, respectively, of said second servo motor.

12. A helicopter control system as recited in claim 11 further including:
    (a) means for monitoring said first sensors to detect an erroneous output therefrom, and (b) means for opening said first power switch to disconnect electrical power from said first servo motor when an erroneous output is detected from any one of said first sensors.

13. A helicopter control system as recited in claim 11 further including:
(a) means for monitoring said second sensors to detect an erroneous output therefrom, and
(b) means for opening said second power switch to disconnect electrical power from said second servo motor when an erroneous output is detected from any one of said second sensors.

14. A helicopter control system as recited in claim 11 further including:
(a) a third air speed sensor,
(b) means for comparing the output of said first air speed sensor with the outputs of said second and third air speed sensors, and
(c) means for opening said first power switch to disconnect electrical power from said first servo motor when the output of said first air speed sensor differs from the outputs of said second and third air speed sensors.

15. A helicopter control system as recited in claim 14 further including:
(a) means for comparing the output of said second air speed sensor with the outputs of said first and third air speed sensors, and
(b) means for opening said second power switch to disconnect electrical power from said second servo motor when the output of said second air speed sensors differs from the outputs of said first and third air speed sensors.

16. A helicopter control system as recited in claim 11 further including:
(a) means for comparing said modified first summation signal with said modified second summation signal to detect a difference therebetween, and
(b) means for opening said first power switch to disconnect electrical power from said first servo motor and for opening said second power switch to disconnect electrical power from said second servo motor when a difference is detected between said modified first summation signal and said modified second summation signal.

17. A helicopter control system as recited in claim 11 further including a brake for each of said servo motors for locking said servo motors when the respective brake is engaged, each said brake being disengaged by excitation of either first or second brake windings, said first windings connected to receive electrical power through a first brake switch and said second windings connected to receive electrical power through a second brake switch.

18. A helicopter control system as recited in claim 17 further including:
(a) means for comparing said modified first summation signal with said modified second summation signal to detect a difference therebetween, and
(b) means for opening said switches to disconnect electrical power from said servo motors and to lock said servo motors by operation of said brakes when a difference is detected between said modified first summation signal and said modified second summation signal.

19. A helicopter control system as recited in claim 17 further including:

(a) means for detecting the failure of any one of said first sensors, and
(b) means for opening said first brake switch for de-energizing said first brake windings when a failure is detected in any one of said first sensors.

20. A helicopter control system as recited in claim 17 further including:
(a) means for detecting the failure of any one of said second sensors, and
(b) means for opening said second brake switch for de-energizing said second brake windings when a failure is detected in any one of said second sensors.

21. A helicopter control system as recited in claim 17 further including:
(a) means for monitoring the voltage and current supplied to said first control winding terminal of said first servo motor to detect when the amplitude of voltage or current supplied thereto passes beyond preset boundaries, and
(b) means for opening said first brake switch for de-energizing said first brake windings when the voltage or current supplied to said first control winding terminal of said first servo motor passes beyond preset boundaries.

22. A helicopter control system as recited in claim 17 further including:
(a) means for monitoring the voltage and current supplied to said first control winding terminal of said second servo motor to detect when the amplitude of voltage or current supplied thereto passes beyond preset boundaries, and
(b) means for opening said second brake switch for de-energizing said second brake windings when the voltage or current supplied to said first control winding terminal of said second servo motor passes beyond preset boundaries.

23. A helicopter control system as recited in claim 17 further including:
(a) means for monitoring the current supplied through said first power switch to said first servo motor to detect when the amplitude of current supplied thereto passes beyond preset boundaries, and
(b) means for opening said first brake switch for de-energizing said first brake windings when the amplitude of current supplied through said first power switch to said first servo motor passes beyond preset boundaries.

24. A helicopter control system as recited in claim 17 further including:
(a) means for monitoring the current supplied through said second power switch to said second servo motor to detect when the amplitude of current supplied thereto passes beyond preset boundaries, and
(b) means for opening said second brake switch for de-energizing said second brake windings when the amplitude of current supplied through said second power switch to said second servo motor passes beyond preset boundaries.

25. A helicopter control system as recited in claim 17 further including:
(a) a third air speed sensor,
(b) means for comparing the output of said first air speed sensor with the outputs of said second and third air speed sensors, and
(c) means for opening said first brake switch to de-energize said first brake windings when the output of said first air speed sensor differs from the outputs of said second and third air speed sensors.

26. A helicopter control system as recited in claim 17 further including:
(a) a third air speed sensor,
(b) means for comprising the output of said second air speed sensor with the outputs of said first and third air speed sensors, and
(c) means for opening said second brake switch to de-energize said second brake windings when the output of said second air speed sensor differs from the outputs of said first and third air speed sensors.

27. The method of optimizing flight of a helicopter as effected by stabilizer attitude which comprises:
(a) sensing longitudinal cyclic commands, collective pitch position and air speed to produce sensor output signals;
(b) combining the outputs of said sensors in a predetermined combination to produce a summation signal;
(c) modifying the summation signal by a factor which changes inversely relative to the air speed;
(d) generating a control function dependent upon said summation signal; and
(e) varying the attitude of said stabilizer in response to said control function.

28. The method of claim 27 wherein said stabilizer is immobilized at air speeds below a predetermined threshold.

29. The method of claim 27 in which variation of said attitude is inhibited below air speeds of a preset threshold.

30. The method of claim 27 in which said stabilizer is locked in position upon failure of any one of a selected set of parameters involved in generating and utilizing said control function.

* * * * *